United States Patent Office 3,795,748
Patented Mar. 5, 1974

---

3,795,748
METHOD OF MANUFACTURING LIQUID-FILLED CHOCOLATE CANDIES
Lorenzo Cillario, Turin, Italy, assignor to Karlschloss Anstalt, Vaduz, Liechtenstein
No Drawing. Filed Aug. 30, 1972, Ser. No. 284,853
Claims priority, application Egypt, Sept. 8, 1971, 397/71
Int. Cl. A23g 3/00
U.S. Cl. 426—282   5 Claims

ABSTRACT OF THE DISCLOSURE

Manufacture of liquid-filled chocolate candies with sugar crust by filling chocolate shells with supersaturated aqueous sugar solution, closing the shells and crystallizing excess sugar from the solution on the inner surface of the chocolate casing. Compactness of the crust is improved by filling into the shells the said solution at a low temperature of at least 0° C., at which the mobility of sugar molecules is substantially blocked, and allowing the temperature of the filing in the casing to rise to above 0° C. thereby to progressively release sugar molecules to form crystallization nuclei adjacent the inner surface of the casing.

---

This invention relates to the manufacture of liquid-filled chocolate candies comprising a chocolate casing, an aqueous saturated solution of sugar (saccharose) in said casing, and a crust of sugar adhering to the inner surface of the casing and preventing the said solution from direct contact with the casing.

The sugar solution usually contains a flavoring component which may be alcoholic or nonalcoholic. For example, Cognac or brandy are typically employed as alcoholic flavoring component, while coffee extract is a typical example of a nonalcoholic flavoring component.

The function of the sugar crust separating the liquid filling from the chocolate casing is to provide a barrier preventing the filling or its components from migrating into and through the casing on standing.

It is known in the art to form the sugar crust by a direct crystallization of sugar on the inner surface of the chocolate casing. In one of the known processes employing this principle a hot aqueous sugar solution having a saturation point exceeding the melting point of the chocolate constituting the casing is brought to a supersaturated condition by cooling below the said melting point and the supersaturated solution obtained in this manner is poured into a preformed chocolate shell; the shell is then closed by applying a chocolate cover on the surface of the liquid filling and the whole is left aside until the excess sugar contained in the supersaturated solution crystallizes on the inner surface of the casing. Occasionally the candies are turned over so that the crust grows uniformly. The melting point of the chocolate constituting the casing is generally not below 30° C. (usually between 33° and 35° C.).

Similarly to all supersaturated solutions, a supersaturated sugar solution is difficult to handle without a substantial risk of a total premature crystallization ("graining"). In this respect, it is known that a supersaturated solution will not adjust spontaneously to the equilibrium condition unless the supersaturation exceeds certain limits; this range of stability is known as "metastable region." As the supersaturation increases beyond said limits a "liable region" is reached. A metastable sugar solution will generally not crystallize unless it is brought in contact with appropriate "seeds," whereas a supersaturated sugar solution in liable condition tends to spontaneously generate sugar nuclei and this tendency is strongly catalyzed by shocks, agitation or friction. In order to minimize the risk of graining, in the aforementioned prior process the hot sugar solution is therefore cooled to but a few degrees centigrades below the softening point of the chocolate, preferably to 26°–28° C., whereby:

(a) The condition of the solution is not excessively liable;
(b) The temperature of the solution will not cause softening or melting of the chocolate shells during pouring;
(c) The solution at said temperature is still sufficiently fluid and, therefore, pourable into the shells.

As the filled and closed shells are left aside (typically for 2–3 days); microscopic particles of sugar and other substances present on the inner surface of the chocolate casing act as "seeds," whereby excess sugar in the solution starts crystallizing on said surface.

It has been found, however, that the compactness of the crust obtained by the above-discussed prior process is generally insufficient to provide an effective barrier between the liquid filling and chocolate casing. Actually, the crust consists of relatively coarse crystals leaving free pores and interstices through which the chocolate casing is accessible to the liquid filling.

An attempt is known to obviate this drawback by dusting the inner surface of the chocolate shell with finely powdered sugar before pouring the supersaturated solution, apparently to provide on said surface more nuclei or seeds than would otherwise be provided by the chocolate surface itself. However, this expedient involves substantial technical complications without warranting a constancy of results when applied in a commercial plant.

It has been found now that an unexpectedly compact sugar crust may be obtained in a very simple manner by merely appropriately controlling certain temperature conditions of the sugar solution.

Accordingly, this invention provides a method of manufacturing liquid-filled chocolate candies comprising a chocolate casing, an aqueous saturated solution of sugar in the casing, and a crust of sugar adhering to the inner surface of the casing and separating the said solution from the casing, by the steps of: preforming a chocolate shell for said casing; forming a hot, nonsupersaturated aqueous solution of sugar having a saturation point exceeding the melting point of the chocolate constituting the shell; bringing the solution to a supersaturated condition by cooling below the said melting point; introducing the supersaturated solution into the preformed shell; closing the shell by a chocolate cover; and crystallizing the excess sugar from the supersaturated solution on the inner surface of the chocolate casing; said method being characterized in that the hot, nonsupersaturated solution of sugar is brought to the supersaturated condition by cooling to a temperature of 0° C. to −10° C. and is introduced in this condition into the shell, and in that the temperature of the supersaturated solution enclosed in the casing is allowed to rise above 0° C.

Preferably, the temperature of the supersaturated solution in the casing is allowed to rise to a value in a range of from 10° C. to ambient temperature (about 20° C.). Also, preferably, the saturation point of the sugar solution is not less than 40° C.

The method according to this invention can be carried out batchwise or continuously. Continuous operation is particularly interesting from the commercial viewpoint. In the latter case, in order to avoid graining due to shocks, friction and other disturbances during cooling of the solution, the hot solution is continuously poured onto a cooled conveyor band (e.g. in an apparatus of the type disclosed by British patent specification 570,827 or 785,584) to form thereon a relatively thin layer of, say, 2–10 mm. thickness. The band is preferably of stainless steel and its active run (conveyor run) may be cooled from below by sprays of brine at a temperature of −15° C. to −20° C. The layer of sugar solution thus travels together with the band, without flowing on the latter, i.e. while remaining under rest condition. Cooling rate, linear speed of the band and cooling path length are so selected that the liquid layer is cooled to a temperature from 0° C. to −10° C., preferably to about −5° C. At the discharge end the band slides in contact with a scraper blade which removes the cool fluid layer from the band. The deep undercooling according to this invention brings the sugar solution to a high viscosity such that the sugar molecules are unable to join each other to form crystals (this phenomenon is known per se in experimental physics). Since during cooling the sugar solution is at rest, its cooling rate (expressed in ° C./minute) is immaterial for the purpose of avoiding graining and, therefore, may be selected at will to suit the production rate of the manufacturing line. The undercooled, supersaturated solution discharged from the conveyor band falls preferably directly into the hopper of a conventional filling apparatus, e.g. of the type comprising one or more rows of metering piston pumps with downwardly directed filling nozzles. The filling apparatus is cooled by a cooling jacket in order to maintain the temperature of the solution in the range of 0° C. to −10° C. Rows of preformed chocolate shells intermittently pass under the nozzles of the filling apparatus through which the metering piston pumps introduce into the shells predetermined portions of the solution. At a next stage chocolate covers are applied to the filled shells in a conventional manner, as in the case of chocolate candies with a cream filling, for example.

At this point of the process the temperature of the undercooled filling is allowed to rise above 0° C. by heat exchange with the outside through the walls of the chocolate casing. This may be done by simply exposing the candies to the ambient atmosphere, the temperature of which typically is between 18° C. and 25° C. However, in order to obtain constant results irrespectively of the actual ambient temperature and humidity, the rows of just formed candies are preferably caused to pass through a conditioning chamber maintained at a temperature of 10–25° C., typically at 15°–20° C., whereby the warming-up rate of the liquid filling is kept under control. The candies leave the conditioning chamber preferably after the temperature of the filling has risen to a value from 10° C. to ambient temperature (20° C.). The candies are then packaged and stored for 2–3 days for crust crystallization; during the storage period the packages are occasionally turned over (say, every 6–8 hours) so that the crust grows uniformly on the entire inner surface of the chocolate casing.

EXAMPLE 1

A hot sugar solution is prepared at 88° C. from saccharose and water in a proportion of 430 kg. saccharose to 100 liters water. After the sugar has completely dissolved, an amount Cognac is added to provide 15 kg. ethyl alcohol in each 100 kg. of the solution; during this addition the temperature of the solution sinks to about 65° C. The saturation point of the aqueous-alcoholic solution obtained in this manner is about 58° C.

The hot solution is continuously poured onto an endless band conveyor of stainless steel, cooled by brine and driven at a linear speed of 4 meters/minute. The pouring rate is selected such that the sugary solution from on the upper run of the band a layer having an average thickness of about 9.5 mm. The solution is removed from the band at a temperature of −6° C. by means of a scraper blade and is discharged into the hopper of a piston-type filling apparatus.

Rows of preformed chocolate shells (melting point 34° C.) are advanced stepwise beneath the filling apparatus and a dose of 6 g. of the sugar solution at −5° C. is introduced into each of the shells. The shells are then closed by a chocolate cover and conveyed through a conditioning chamber kept at 20° C. The residence time in the chamber is roughly 15 minutes. The temperature of the liquid filling in the candies leaving the conditioning chamber is above 10° C. The candies are packaged and transferred into a storage room maintained at a temperature of 18° C. The packages in the storage room are turned over first after 8 hours and a second time after further 12 hours. The crust is completely formed within 48 hours. At the end of this period the candy packages are ready for distribution on the market.

The crust of sugar shows a compact, finely crystalline structure. The average thickness of the crust is about 0.3 mm.

EXAMPLE 2 (Comparative)

A hot solution is prepared exactly as in Example 1; also, chocolate shells similar to those employed in Example 1 are used.

The hot solution is carefully cooled to 28° C. and filled at this temperature into the shells. After closure of the shells the so-obtained candies are packaged and the packages are stored at 18° C. During storage, the packages are turned over a first time after 8 hrs. and a second time after further 12 hrs. The crust formation is complete within 3 days. The crust shows a coarsely crystalline structure. The average thickness of the crust is about 0.5 mm. Since the mass of crystallized sugar in this example is obviously the same as in Example 1, the average thickness of 0.5 mm. of the crust as compared with the average thickness of 0.3 mm. in Example 1 gives a clear idea of voids present in the crust of Example 2 due to a coarse crystallinity.

As an attempt of explanation of the result obtained with the method according to the invention the following may be postulated.

In Example 2, the temperature of the liquid filling allows for a free mobility of sugar molecules all over the filling. Thus, as "nucleation" of the crystals occurs on a relatively few nucleation sites present on the inner surface of the chocolate casing, the sugar molecules tend to grow crystals on the already available nucleation sites rather than to form further nuclei. In other words, the mobility freedom of sugar molecules in the whole volume of the liquid filling apparently favors the crystal growth rate rather than the nucleation rate.

In Example 1, representing the method according to this invention, the initial mobility of sugar molecules is practically nil. The molecules start moving along the interface between the filling and the casing only when the said interface has regained a sufficient temperature level due to inflow of heat from the outside through the walls of the casing, while the sugar molecules in the body of the filling are still blocked. Thus, some of the sugar molecules "released" at said interface meet their proximal nucleation sites available on the surface of the casing, while a great multitude of further molecules meet each other to form further nuclei (essentially because the interface layer of the filling is now in its extremely labile condition due to a degree of supersaturation which is uncomparably higher than in Example 2). As the inflow of heat continues, further molecules are released from the body of the filling and contribute to the nucleation in the interface layer and/or in direct proximity thereto, the migration of the molecules towards the interface layer being stimulated by the fact that, owing to nucleation and incipient crystal formation, the supersaturation of the interface layer substantially decreases in comparison with the supersaturation of its underlying layer. As a result, myriads of nuclei are formed in the interface region of the filling as the latter warms up in the chocolate casing. The nucleation is particularly satisfactory and uniform by keeping the conditioning chamber at a temperature not excessively high, thereby to slow down the warming-up rate of the filling. Conditioning temperatures of 15° C. to 20° C. are recommendable. In these conditions the rate of heat inflow to the filling is automatically regulated by the resistance opposed by the walls of the chocolate casing, the thickness of which typically is from about 2 mm. to about 5 mm. It is to be understood that once the nucleation has substantially progressed, the crystal growth occurs in usual manner during the storage period; obviously, since the available amount of sugar is the same in Example 1 as in Example 2, the crystals finally obtained in Example 1 are relatively fine and densely distributed owing to a substantially greater number of nuclei.

What I claim is:

1. In the method of manufacturing liquid-filled chocolate casing, a aqueous saturated solution of sugar in said casing, and a crust of sugar adhering to the inner surface of the casing and preventing the said solution from direct contact with the casing, comprising the steps of:
 (a) preforming a chocolate shell for said casing;
 (b) forming a hot, nonsupersaturated aqueous solution of sugar having a saturation point exceeding the melting point of the chocolate constituting the shell;
 (c) bringing the solution to a supersaturated condition by cooling below the said melting point;
 (d) introducing the supersaturated solution into the preformed shell;
 (e) closing the shell by a chocolate cover and crystallizing the excess sugar from the supersaturated solution on the inner surface of the chocolate casing;
the improvement comprising:
 (f) bringing the solution to a supersaturated condition in step (c) by cooling the solution to a temperature of 0° C. to −10° C. and introducing the supersaturated solution at a temperature within the latter range into the preformed chocolate shell; and
 (g) allowing the temperature of the solution in the chocolate casing to rise above 0° C. by heat inflow from the outside through the walls of the casing.

2. The improvement as claimed in claim 1, wherein the temperature of the solution is allowed to rise in step (g) to at least 10° C.

3. The improvement as claimed in claim 1, wherein the temperature of the soluton is allowed to rise in step (g) to a value of from 10° C. to 20° C. placing the candies in a conditioning chamber maintained at a temperature not exceeding 25° C.

4. The improvement as claimed in claim 3, wherein the temperature in the chamber is from 15° C. to 20° C.

5. The improvement as claimed in claim 1, wherein the saturation point of the solution is at least 40° C.

References Cited

UNITED STATES PATENTS 3,496,886    2/1970    Fohr _____ 99—134

FOREIGN PATENTS 1,172,417    11/1969    Great Britain _____ 99—134

A. LOUIS MONACELL, Primary Examiner

J. M. HUNTER, Assistant Examiner